Patented Nov. 26, 1946

2,411,662

UNITED STATES PATENT OFFICE 2,411,662

IMINO-DI-FATTY ACID AMIDE

Henry Martin and Hans Gysin, Basel, Switzerland, assignors to the firm J. R. Geigy A. G., Basel, Switzerland No Drawing. Application April 28, 1944, Serial No. 533,265. In Switzerland May 13, 1943

9 Claims. (Cl. 260—561)

Heterocyclic and aromatic carboxylic acid amides have already been described as being agents, acting in a promoting manner, while corresponding compounds of the aliphatic series often show an opposite efficacy. Thus for example the isovalerianic acid diethyl amide (cf. Deutsche med. Wochenschrift 1901, No. 49) as well as the methyl ethyl acetic acid diethyl amide (cf. Archiv der Pharmazie 1935, 202) provokes a sedative action.

It has now surprisingly been found that N-substituted imino-di-fatty acid amide containing at least a double substituted amide group possess valuable therapeutical properties. Such compounds may be prepared according to various methods, thus for instance in dependence of the order of succession of the substitution of the imino-N-atom and of the amination.

For instance the said compounds may readily be prepared by interaction of N-monosubstituted or N-unsubstituted α-amino fatty acid amides, whose acid amide groups are twice substituted, with halogen fatty acid derivatives. The N-unsubstituted or N-monosubstituted α-amino fatty acid amides required for the interaction and whose acid amide groups are twice substituted may be produced by causing α-halogen carboxylic acid amides to react with ammonia or primary amines like methyl amine, ethyl amine, propyl amine, butyl amine, amyl amine, hexyl amine, allyl amine, isopropyl amine, cyclohexyl amine, benzyl amine, phenyl ethyl amine, phenyl isopropyl amine and so on. The α-halogen carboxylic acid amides are prepared according to known methods from the corresponding acids or functional derivatives thereof with secondary amines such as dimethyl amine, diethyl amine, diallyl amine, methyl ethyl amine, methyl propyl amine, methyl aniline, methyl benzyl amine etc. As examples of α-amino fatty acid amides which may be used, there may be enumerated:

α-methyl amino acetic acid diethyl amide,
α-methyl amino acetic acid dimethyl amide,
α-methyl amino propionic acid dimethyl amide,
α-methyl amino propionic acid diethyl amide,
α-ethyl amino propionic acid piperidide,
α-butyl amino propionic acid dimethyl amide,
α-methyl amino butyric acid dimethyl amide,
α-ethyl amino butyric acid diethyl amide,
α-ethyl amino butyric acid morpholide,
α-methyl amino valerianic acid dimethyl amide,
α-methyl amino valerianic acid diethyl amide,
α-methyl amino capronic acid dimethyl amide, etc.

For the interaction of these α-amino fatty acid amides with halogen fatty acid derivatives α-, but also other halogen fatty acid derivatives are especially suitable. In this connection, there may be mentioned for example:

chloracetic acid,
chloracetic ester,
chloracetonitrile,
chloracetic acid diethyl amide,
chloracetic acid diallyl amide,
α-bromopropionic acid piperidide,
α-bromopropionic acid ethyl ester,
α-bromopropionic acid diethyl amide,
α-bromopropionic acid methyl ethyl amide,
α-bromopropionic acid methyl anilide,
α-bromopropionic acid monoethyl amide,
α-bromobutyric acid ethyl ester,
α-bromobutyric acid ethyl amide,
α-bromobutyric acid dimethyl amide,
α-bromobutyric acid methyl ethyl amide,
α-bromotutyric acid diethyl amide,
α-bromobutyric acid diallyl amide,
α-bromovalerianic acid dimethyl amide,
α-bromovalerianic acid diethyl amide and the like.

A further manner suitable for the production of a subgroup of the claimed compounds of symmetrical structure consists in that α-halogen fatty acid amides, the amide nitrogen of which is twice substituted, are brought to double interaction by means of ammonia or primary amines.

Moreover, it is also possible to subsequently substitute, for instance to alkylate or to cycloalkylate N-substituted imino-di-fatty acid amides, whose amide groups still possess a replaceable hydrogen atom (see Titherley, J. Chem. Soc. London 79,391, (1901). Furthermore, as far as a hydrogen atom is still present in the imino group of the imino-di-fatty acid amide, the said hydrogen atom can subsequently be replaced, for instance by means of alkylating or aralkylating agents like for example dimethyl sulfate, diethyl sulfate, benzyl chloride, phenyl ethyl bromide or by any other substitution agents like methyl iodide or, e. g., by a treatment with formaldehyde and formic acid.

Finally a further preparation method of the claimed compounds consists in aminating imino-di-fatty acids with one or two free carboxylic groups or their functional derivatives, for example by interaction with secondary amines; likewise the salts of the imino-di-fatty acids or of monobasic derivatives may be caused to react with carbamic acid halides deriving from secondary amines.

The new compounds are partly water-soluble; by acids they may be transformed into neutral salts. These substances may be used as therapeutics and especially as analeptics; many of them are also suitable as solvents.

The following examples and tables will illustrate the invention, without being limited thereto. The parts are by weight.

EXAMPLE 1

37.2 parts of α-ethyl amino butyric acid diethyl amide (prepared from α-bromobutyric acid diethyl amide and ethyl amine) are dissolved in 200 parts of anisol and heated to boiling. Then under stirring 15 parts of chloracetic acid diethyl amide are caused to drop thereinto and the whole is boiled overnight under reflux. After cooling the α-ethyl amino butyric acid diethyl amide hydrochloride separates out; the anisol solution is separated from the hydrochloride, made acid to Congo red by means of hydrochloric acid and freed from the organic solvent. Then the hydrochloric acid solution is saturated with potassium hydroxide and the N-ethyl imino butyric acid acetic acid bis-diethyl amide is dissolved in xylene. After distillation of the solvent the product is rectified in high vacuo. Its boiling point at 0.3 mm. pressure is 152°–153° C. The product is miscible with water and organic solvents and yields, by means of acids, neutral salts. The same compound is also obtained by interaction of ethyl amino acetic acid diethyl amide with α-halogenbutyric acid diethyl amides.

Very similar products are obtained by starting from α-benzyl amino butyric acid diethyl amide or ethyl amino isobutyric acid diethyl amide.

The following Table 1 contains further compounds of the general formula

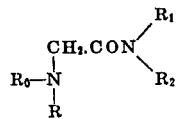

which compounds can be prepared according to the above mentioned two methods.

Table 1

EXAMPLE 2

43.2 parts of α-ethyl amino propionic acid dimethyl amide (prepared from α-bromopropionic acid dimethyl amide and ethyl amine) are dissolved in 150 parts of anisol, then at 150° C. 31.2 parts of α-bromopropionic acid diethyl amide in 50 parts of anisol are caused to drop thereinto and the mixture is boiled under reflux during 12 hours. The working up and purification is carried out in the manner described in Example 1. The resulting N-ethyl-imino-dipropionic acid diethyl dimethyl amide boils at 143°–145° C. at a pressure of 0.25 mm. It is an almost colorless oil which is easily soluble in water and organic solvents and which gives neutral salts with acids.

The following Table 2 contains further compounds of the general formula

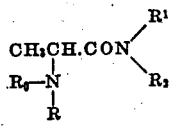

*Table 2*

| No. | $R_1=R_2$ | $R_0$ | R | B. P., mm. | Form |
|---|---|---|---|---|---|
| 1 | —CH₃ | —CH₂CH₃ | CH₃ĊH.CON(CH₃)₂ | 130°–132° C., 0.3 | Liquid. |
| 2 | do | —CH—CH=CH₂ | do | 136°–138° C., 0.3 | Do. |
| 3 | do | —CH₂CH₂CH₃ | do | 135°–137° C., 0.2 | Do. |
| 4 | —C₂H₅ | do | do | 139°–140° C., 0.3 | Do. |
| 5 | do | do | CH₃ĊH.CON(C₂H₅)₂ | 142°–144° C., 0.2 | Do. |
| 6 | —CH₃ | —CH₂CH₂CH₂CH₃ | CH₃ĊH.CON(CH₃)₂ | 132°–135° C., 0.09 | Do. |
| 7 | do | —CH(C₂H₅)(CH₃) | do | 168°–171° C., 0.85 | Do. |
| 8 | do | —CH₂CH₂CH₂CH₃ | CH₃ĊHCON(C₂H₅)₂ | 133°–136° C., 0.09 | Do. |
| 9 | —C₂H₅ | —CH₃ | CH₃ĊH.CON(C₂H₅)₂ | 133° C., 0.01 | Do. |
| 10 | do | —CH₂CH₃ | do | 130°–131° C., 0.07 | Do. |
| 11 | do | —CH(CH₃)₂ | do | 147°–150° C., 0.32 | Do. |
| 12 | do | —CH₂CH₂CH₂CH₃ | CH₃ĊHCON(C₂H₅)₂ | 153°–160° C., 0.25 | Do. |
| 13 | do | —CH₂CH₃ | CH₃ĊH.CON—C₆H₄(CH₃) | 143°–146° C., 0.03 | Do. |
| 14 | do | do | CH₃ĊH.CON(morpholine/piperidine ring) | 160°–162° C., 0.05 | Do. |
| 15 | do | do | CH₃ĊHCON(piperidine ring with CH₃) | 152°–155° C., 0.015 | Do. |
| 16 | do | do | CH₃ĊH.CON(morpholine ring) | 150°–151° C., 0.02 | Do. |
| 17 | do | —CH₂CH₂—C₆H₅ | CH₃ĊH.CON(C₂H₅)₂ | 197°–200° C. 0.04 | Viscous. |
| 18 | do | —CH₂CH₃ | CH₃ĊH.CONH.C₂H₅ | 170°–173° C., 0.4 | Liquid. |
| 19 | —CH₃ | do | CH₃CH₂CH₂ĊH.CON(CH₃)₂ | 127°–129° C., 0.02 | Do. |
| 20 | do | do | CH₃CH₂CH₂CH₂ĊH.CON(CH₃)₂ | 158°–160° C., 0.8 | Do. |
| 21 | —C₂H₅ | do | CH₃CH₂CH₂ĊH.CON(CH₃)₂ | 163°–166° C., 0.55 | Do. |
| 22 | —CH₃ | —CH₃.CH₃ | CH₃CH₂CH₂ĊH.CON(C₂H₅)₂ | 131°–133° C., 0.02 | Do. |
| 23 | do | —CH₂CH₃ | CH₃CH₂CH₂CH₂ĊH.CON(C₂H₅)₂ | 140°–143° C., 0.02 | Do. |
| 24 | —C₂H₅ | —CH₃ | CH₃CH₂CH₂CH₂ĊH.CON(CH₃)₂ | 137°–139° C., 0.03 | Do. |
| 25 | do | —CH₂CH₃ | do | 146°–149° C., 0.06 | Do. |
| 26 | do | —CH₃ | CH₃CH₂CH₂ĊH.CON(C₂H₅)₂ | 138°–139° C., 0.08 | Do. |

Table 2—Continued

| No. | R₁=R₂ | R₀ | R | B. P., mm. | Form |
|---|---|---|---|---|---|
| 27 | —C₂H₅ | —C₂H₅ | CH₃CH₂CH₂ĊH.CON(C₂H₅)₂ | 141°–143° C., 0.03 | Liquid. |
| 28 | do | do | CH₃CH₂CH₂CH₂ĊH.CON(C₂H₅)₂ | 138°–141° C., 0.02 | Do. |
| 29 | do | do | CH₃\\CH—ĊH.CON(C₂H₅)₂ /CH₃ | 134°–137° C., 0.02 | Do. |

EXAMPLE 3

55.8 parts of α-ethyl amino butyric acid diethyl amide (made from α-bromobutyric acid diethyl amide and ethyl amine) are dissolved in 150 parts of tetraline, then under stirring at 180°–190° C. 31.2 parts of α-bromopropionic acid diethyl amide are caused to drop thereinto, whereupon the mixture is maintained for 12 hours at this temperature. The working up takes place as described in Example 1. The N-ethyl-iminobutyric acid propionic acid bis-diethyl amide boils at a pressure of 0.2 mm. at 145–147° C. It forms with acids easily soluble, neutral salts.

In the following Table 3 further compounds of the general formula

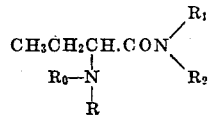

are enumerated.

The compounds mentioned in the Examples 2 and 3 and in the tables belonging thereto can be produced, as has been described in Example 1, according to both the cited methods.

EXAMPLE 4

149.5 parts of chloracetic acid diethyl amide are dissolved in 200 parts of benzene and heated for 3 hours in the autoclave to 110°–120° C. with 90 parts of ethyl amine. The ethyl amine hydrochloride thus formed is filtered by suction, the benzene solution washed with caustic potash lye, freed from the solvent and distilled.

The first running consists of ethyl amino acetic acid diethyl amide; boiling point at 20 mm. pressure=113°–115° C. The N-ethyl-imino-di-acetic acid bis-diethyl amide distills at 0.4 mm. pressure at 158°–159° C. and constitutes a colorless liquid being easily soluble in water and organic solvents and producing neutral salts by means of acids.

The N-ethyl-imino-di-acetic acid bis-diethyl

Table 3

| No. | R₁ | R₂ | R₀ | R | B. P., mm. | Form |
|---|---|---|---|---|---|---|
| 1 | —CH₃ | —CH₃ | —CH₂CH₃ | CH₃ĊH.CON(CH₃)(C₃H₇) | 142°–145° C., 0.45 | Liquid. |
| 2 | do | do | —CH₂CH₂CH₂CH₂ | CH₃ĊH.CON(CH₃)₂ | 127°–130° C., 0.04 | Do. |
| 3 | do | do | —CH₃ | CH₃ĊH.CON(C₂H₅)₂ | 142°–145° C., 0.27 | Do. |
| 4 | do | do | —C₂H₅ | do | 130°–132° C., 0.18 | Do. |
| 5 | —C₂H₅ | —C₂H₅ | —CH₃ | CH₃ĊH.CON(CH₃)₂ | 139°–140° C., 0.2 | Do. |
| 6 | do | do | —CH₂CH₃ | CH₃ĊH.CON(CH₃)(C₃H₇) | 144°–146° C., 0.25 | Do. |
| 7 | —CH₃ | do | —CH₃ | CH₃ĊH.CON(C₂H₅)₂ | 129°–132° C., 0.02 | Do. |
| 8 | do | do | —CH₂CH₃ | do | 130°–133° C., 0.05 | Do. |
| 9 | —C₂H₅ | do | —CH₂CH₂CH₂CH₃ | CH₃ĊH.CON(CH₃)₂ | 141°–144° C., 0.1 | Do |
| 10 | do | do | —CH₃ | CH₃ĊH.CON(C₂H₅)₂ | 143°–146° C., 0.15 | Do. |
| 11 | do | do | —CH₂CH₂CH₂CH₃ | do | 145°–148° C., 0.18 | Do. |
| 12 | —CH₃ | —CH₃ | —CH₂CH₃ | CH₃CH₂ĊH.CON(CH₃)₂ | 115°–117° C., 0.03 | Do. |
| 13 | do | do | —CH₃ | CH₃CH₂ĊH.CON(C₂H₅)₂ | 138°–141° C., 0.25 | Do. |
| 14 | do | do | —CH₂CH₃ | do | 123°–126° C., 0.02 | Do. |
| 15 | —C₂H₅ | —C₂H₅ | —C₂H₅ | do | 135°–137° C., 0.03 | Do. |
| 16 | —CH₃ | —CH₃ | —CH(CH₃)CH₃ | CH₃ĊH.CON(C₂H₅)₂ | 125°–128° C., 0.03 | Do. |
| 17 | CH₂—CH₂ \\ O / CH₂—CH₂ | | —C₂H₅ | do | 152°–155° C., 0.02 | Do. |
| 18 | —CH₂CH=CH₂ | —CH₂CH=CH₂ | do | do | 148°–151° C., 0.03 | Do. |
| 19 | —C₂H₅ | —C₂H₅ | do | CH₃CH₂CH₂ĊHCOOC₂H₅ | 121°–124° C., 0.03 | Do. |
| 20 | —CH₃ | H | do | —CH₂CON(C₂H₅)₂ | 185°–188° C., 0.6 | Do. | amide may also be prepared more advantageously according to the method described in Example 1.

From the ethyl amino acetic diethyl amide obtainable as by-product it is possible to produce compounds according to the present invention when working in accordance with the methods of the Examples 1 to 3 by interaction with chloracetic acid and by neutralisation with chloracetic ester, chloraceto-nitrile, etc.

EXAMPLE 5

36 parts of α-N-ethyl-imino-butyric acid ethyl amide acetic acid diethyl amide (see table Example 1) having the formula

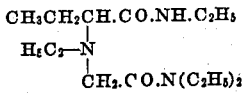

are dissolved in xylene, treated with 4 parts of sodium amide and heated for some time on the water-bath until no more ammonia is developed. Then the sodium compound is heated in the autoclave at 180°–190° C. with 16.5 parts of potassium ethyl sulfate. After having separated the potassium sodium sulfate the solvent is distilled off and the N-ethyl-imino-butyric acid acetic acid bis-diethyl amide is rectified in the high-vacuo. B. P.$_{0.03\,mm.}$ 134°–136° C.

The same compound can also be prepared according to any one of the methods described in the above process.

EXAMPLE 6

27.1 parts of α-imino-dipropionic acid bis-diethyl amide of the formula

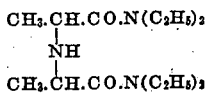

are heated for several hours on the water-bath with 13.5 parts of 85% formic acid and 20 parts of 35% formaldehyde. Then 12 parts of concentrated hydrochloric acid are added thereto and the formic acid as well as the excess of formaldehyde are distilled off. The residue is treated with water and saturated with potassium hydroxide. The formed N-methyl-imino-di-(propionic acid diethylamide) is dissolved in benzene and dried over solid potassium hydroxide. After distillation of the solvent it is rectified in high-vacuo. B. P.$_{0.01\,mm.}$ 133° C.

The same compound may also be produced according to the method described in Example 2. By methylation with dimethyl sulfate or methyl iodide the same compound is obtained, while analogous derivatives may be prepared by interaction with other alkylating agents or also with aralkylating agents like diethyl sulfate, ethyl chloride, benzyl chloride, phenyl ethyl bromide and so on.

EXAMPLE 7

30 parts of α-N-ethyl-imino-di-n-butyric acid diethyl ester of the formula

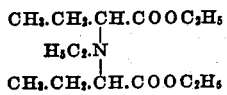

(made from α-bromobutyric acid ethyl ester and ethyl amine) are boiled under reflux for several hours with concentrated hydrochloric acid. Then the solution is concentrated by evaporation to dryness and heated for some time to 50° C. with the calculated quantity of phosphorus pentachloride. After having eliminated the phosphorus oxychloride in vacuo one obtains the hydrochloride of the N-ethyl-imino-di-n-butyric acid dichloride which is introduced into an excess of a diethyl amine solution. After having removed the diethyl amine hydrochloride by filtration, there is distilled in the high-vacuo. Thus the N-ethyl-imino-di-n-butyric acid bis-diethyl amide is obtained in form of a colourless oil boiling at a pressure of 0.03 mm. at 133°–135° C.

The same product is also obtained by heating the disodium salt of the N-ethyl-imino-di-n-butyric acid with diethyl carbamic acid chloride to 150°–160° C. or by working in the manner described in Example 3.

What we claim is:

1. An imino-di-fatty acid amide of the formula

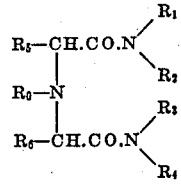

wherein $R_5$ and $R_6$ each represents a member selected from the group consisting of H and lower alkyl, $R_0$ represents a member selected from the group consisting of lower alkyl, allyl, benzyl, phenethyl and cyclohexyl, $R_1$ represents a member selected from the group consisting of H, lower alkyl and allyl, and $R_2$, $R_3$ and $R_4$ each represents a member selected from the group consisting of lower alkyl and allyl.

2. An imino-di-fatty acid amide of the formula

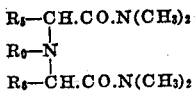

wherein $R_5$ and $R_6$ each represents a member selected from the group consisting of H and lower alkyl, and $R_0$ represents a member selected from the group consisting of lower alkyl, allyl, benzyl, phenethyl and cyclohexyl.

3. An imino-di-fatty acid amide of the formula

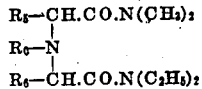

wherein $R_5$ and $R_6$ each represents a member selected from the group consisting of H and lower alkyl, and $R_0$ represents a member selected from the group consisting of lower alkyl, allyl, benzyl, phenethyl and cyclohexyl.

4. An imino-di-fatty acid amide of the formula

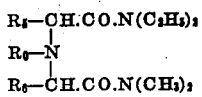

wherein $R_5$ and $R_6$ each represents a member selected from the group consisting of H and lower alkyl, and $R_0$ represents a member selected from the group consisting of lower alkyl, allyl, benzyl, phenethyl and cyclohexyl.

5. An imino-di-fatty acid amide of the formula

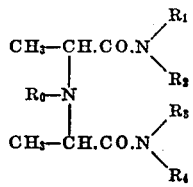

wherein $R_0$ represents a member selected from the group consisting of lower alkyl, allyl, benzyl, phenethyl and cyclohexyl, $R_1$ represents a member selected from the group consisting of H, lower alkyl and allyl, and $R_2$, $R_3$ and $R_4$ each represents a member selected from the group consisting of lower alkyl and allyl.

6. An imino-di-fatty acid amide of the formula

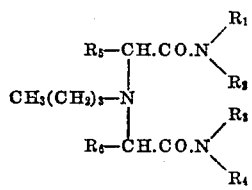

wherein $R_5$ and $R_6$ each represents a member selected from the group consisting of H and lower alkyl, $R_1$ represents a member selected from the group consisting of H, lower alkyl, and allyl and $R_2$, $R_3$ and $R_4$ each represents a member selected from the group consisting of lower alkyl and allyl.

7. The imino-di-fatty acid amide of the following formula

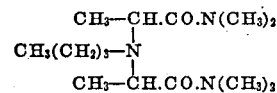

being a colorless liquid of the boiling point at 0.09 mm. pressure of 132°–135° C.

8. The imino-di-fatty acid amide of the following formula

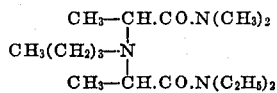

being a colorless liquid of the boiling point at 0.09 mm. pressure of 133°–136° C.

9. The imino-di-fatty acid amide of the following formula

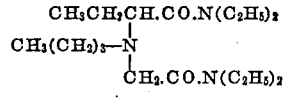

being a colorless liquid of the boiling point at 0.12 mm. pressure of 148°–151° C.

HENRY MARTIN.
HANS GYSIN.